United States Patent
Ziegler et al.

(10) Patent No.: US 12,139,276 B2
(45) Date of Patent: Nov. 12, 2024

(54) SYSTEM AND METHOD OF ENERGY AND MASS TRANSFER IN LOW-GRAVITY ENVIRONMENTS

(71) Applicant: Space Kinetic Corp, Oakland, CA (US)

(72) Inventors: Scott Ziegler, Lafayette, CA (US); Vu Vuong, Oakland, CA (US)

(73) Assignee: Space Kinetic Corp, Rio Rancho, NM (US)

(*) Notice: Subject to any disclaimer, the term of this patent is extended or adjusted under 35 U.S.C. 154(b) by 0 days.

(21) Appl. No.: 17/734,051

(22) Filed: Apr. 30, 2022

(65) Prior Publication Data
US 2023/0227179 A1 Jul. 20, 2023

Related U.S. Application Data

(60) Provisional application No. 63/299,963, filed on Jan. 15, 2022.

(51) Int. Cl.
*B64G 1/00* (2006.01)
*B64F 1/06* (2006.01)
(Continued)

(52) U.S. Cl.
CPC ............ *B64G 1/002* (2013.01); *B64F 1/06* (2013.01); *B64G 5/00* (2013.01); *B64G 99/00* (2022.08)

(58) Field of Classification Search
CPC ........ B64G 1/002; B64G 1/006; B64G 1/008; B64G 5/00; B64G 99/00; B64F 1/06
See application file for complete search history.

(56) References Cited

U.S. PATENT DOCUMENTS

| 1,316,397 A | 9/1919 | Steinberger |
| 4,632,086 A | 12/1986 | Rutten |

(Continued)

FOREIGN PATENT DOCUMENTS

| CN | 101559286 | 10/2009 |
| CN | 108724187 A | 11/2018 |

(Continued)

OTHER PUBLICATIONS

Qadeer et al., Intelligent Tracking of Mechanically Thrown Objects by Industrial Catching Robot for Automated In-Plant Logistics 4.0, Sensors (Mar. 2022).

(Continued)

*Primary Examiner* — Rodney A Bonnette
(74) *Attorney, Agent, or Firm* — Venjuris, P.C.

(57) ABSTRACT

A system and method for transferring energy and mass (supplies) in low-gravity environments. The system comprises a launcher and a receiver. The launcher hurls a capsule at a high velocity such that, when caught by the receiver, a portion of the kinetic energy of the launched capsule is converted to potential energy and stored. The stored energy is used at the receiver end for applications such as living habitats, mining operations, life-support systems, etc. In some instances, a portion of the initial energy is used to lob the capsule back, if desired. Launchers and receivers can be set up in different spatial configurations in a low-gravity environment such as in a circle with a centrally located launcher, a launcher downstream of a chain of receivers, or other configurations.

19 Claims, 9 Drawing Sheets

(51) Int. Cl.
  *B64G 5/00* (2006.01)
  *B64G 99/00* (2009.01)

(56) References Cited

U.S. PATENT DOCUMENTS

| | | | |
|---|---|---|---|
| 5,857,451 | A | 1/1999 | Ciluffo et al. |
| 9,440,353 | B1 | 9/2016 | da Silva et al. |
| 10,023,393 | B2 | 7/2018 | Brazeau et al. |
| 10,144,591 | B2 | 12/2018 | Brazeau et al. |
| 10,759,052 | B2 | 9/2020 | Scott et al. |
| 10,926,408 | B1 | 2/2021 | Vogelsong et al. |
| 2009/0224097 | A1* | 9/2009 | Kariv .............. B64F 1/029 244/110 F |
| 2010/0314497 | A1* | 12/2010 | Boelitz .............. B64G 1/002 701/99 |
| 2013/0007935 | A1* | 1/2013 | Chin .............. B64G 6/00 244/33 |
| 2014/0306066 | A1 | 10/2014 | Burch |
| 2018/0162553 | A1* | 6/2018 | Powers .............. F41F 3/052 |
| 2018/0237171 | A1 | 8/2018 | Yaney |
| 2019/0389603 | A1 | 12/2019 | Burch |
| 2020/0009351 | A1 | 1/2020 | Walzman |

FOREIGN PATENT DOCUMENTS

| | | |
|---|---|---|
| CN | 109533826 | 3/2019 |
| CN | 208994531 | 6/2019 |
| JP | 2020066335 | 4/2020 |
| WO | WO2015/167384 | 11/2015 |

OTHER PUBLICATIONS

Okada et al., Robust Throwing Design Based on Dynamic Sensitivity Analysis, The Japan Society of Mechanical Engineers (Jan. 2019).

Frank et al., Throwing Objects A bio inspired Approach for the Transportation of Parts, International Conference on Robotics and Biomimetios, Dec. 17-20, 2006, Kunming, China.

Kotenberg et al. US Patent Application for Projectile Transmission of Lunar Resources, US Provisional Patent Application filed Jun. 17, 2021, U.S. Appl. No. 63/212,058.

Kari Rodriquez, International Search Report and Written Opinion, PCT application PCT/US/2023/066349 (Oct. 5, 2023).

* cited by examiner

SYSTEM AND METHOD OF ENERGY AND MASS TRANSFER IN LOW-GRAVITY ENVIRONMENTS

CROSS-REFERENCE TO RELATED APPLICATIONS

Priority is claimed in the application data sheet to the following patents or patent applications, the entire written description of each of which is expressly incorporated herein by reference in its entirety:
63/299,963

BACKGROUND

Field of the Art

The disclosure relates to the field of transportation, and more particularly to the field of energy and mass transportation.

Discussion of the State of the Art

Right now, there is a renewed space-race sweeping the globe. Sparked by the now-viable idea of mining asteroids, space-tourism, colonizing the Moon and Mars, and becoming a space-faring civilization; these ideas have not only sparked enthusiasm in the collective human consciousness, but driven governments and affluent private citizens to make these ideas a reality. Many challenges will present themselves with these endeavors, but one in particular, still poses a significant hurdle in need of solutions: power distribution. What makes power distribution off-world so challenging is the prohibitive nature of implementing and scaling Earth-based power distribution and logistics techniques and methods, which typically require running power lines long distances and drawing on sources of energy such as coal, hydroelectric power, nuclear energy, and solar power.

Consider that at the time of writing, materials and launch costs for traditional power distribution systems for a moon mining site could cost anywhere from $326 million dollars in materials and launch costs (assuming $90,000 per kilogram in launch costs) up to $3.6 billion (assuming $1 million per kilogram in launch costs). The largest cost comes with the amount of cable that would need to be lifted off Earth and transported to the lunar surface. Today it costs $1 million dollars per kilogram in lunar lift costs. Even if those costs were to come down to $90,000 per kilogram (a figure recently estimated for launch costs far in the future), it would cost $250 million dollars for one kilometer of cable to transmit one kilowatt of power.

Additionally, it is possible that a permanent lunar base could be established within a few years for lunar exploration, followed in future years by mining, refueling, surveying and space tourism. Such activities will require a lot of energy and an efficient supply chain. While many companies have offered varied solutions based on technologies used on Earth, none of the solutions are either cost effective or capable of practical application for use on the Moon. Simply put, energy distribution technologies used on Earth cannot be used to scale operations economically on the Moon and in other low-gravity environments.

What is needed is a system and method is a cost-effective and practical means for energy and supplies distribution in low-gravity environments.

SUMMARY

Accordingly, the inventors have conceived, and reduced to practice, a system and method for transferring energy and mass (supplies) in low-gravity environments. The system comprises a launcher and a receiver. The launcher hurls a capsule at a high velocity such that, when caught by the receiver, a portion of the kinetic energy of the launched capsule is converted to potential energy and stored. The stored energy is used at the receiver end for applications such as living habitats, mining operations, life-support systems, etc. In some instances, a portion of the initial energy is used to lob the capsule back, if desired. Launchers and receivers can be set up in different spatial configurations in a low-gravity environment such as in a circle with a centrally located launcher, a launcher downstream of a chain of receivers, or other configurations.

According to a first embodiment, a system for energy and mass transportation is disclosed, comprising: a plurality of capsules; a capsule launching mechanism comprising a first rotatable arm; wherein the capsule launching mechanism performs the steps of: loading at least one capsule from the plurality of capsules into the first rotatable arm; sending a computed trajectory to a capsule handling mechanism, the computed trajectory comprising parameters required to deliver at least the one capsule to a second rotatable arm of the capsule handling mechanism; receiving a notification from the capsule handling mechanism that it is ready to receive the capsule; aligning the first rotating arm based on the computed trajectory; initializing rotation of the first rotatable arm according to the computed trajectory parameters; and releasing the one capsule from the first rotatable arm according to the computed trajectory parameters; and the capsule handling mechanism comprising a second rotatable arm; wherein the capsule handling mechanism performs the steps of: receiving the computed trajectory; preparing the second rotatable arm for receiving at least the one capsule; sending the notification to the capsule launching mechanism; catching the one capsule with the second rotatable arm; and converting the kinetic energy from the one capsule as electric energy using regenerative braking.

According to a second embodiment, a method for energy and mass transportation is disclosed, comprising the steps of: loading at least one capsule from a plurality of capsules into a first rotatable arm attached to a capsule launching mechanism; sending a computed trajectory to a capsule handling mechanism, the computed trajectory comprising parameters required to deliver at least the one capsule to a second rotatable arm of the capsule handling mechanism; receiving the computed trajectory at the capsule handling mechanism; preparing the second rotatable arm for receiving at least the one capsule; sending a notification to the capsule launching mechanism; receiving the notification from the capsule handling mechanism that it is ready to receive the capsule; aligning the first rotatable arm based on the computed trajectory; initializing rotation of the first rotatable arm according to the computed trajectory parameters; releasing the one capsule from the first rotatable arm according to the computed trajectory parameters; and catching the one capsule with the second rotatable arm; and converting the kinetic energy from the one capsule as electric energy using regenerative braking.

According to various aspects: wherein the capsule launching mechanism can perform the steps of the capsule handling mechanism; wherein the capsule handling mechanism can perform the steps of the capsule launching mechanism; wherein both the capsule launching mechanism and the capsule handling mechanism having regenerative braking technologies used to convert kinetic energy to electrical energy; wherein the electrical energy is stored, used, transported, or some combination thereof; wherein the capsule handling mechanism returns the capsule to the capsule launching mechanism; wherein the capsule handling mechanism sends the capsule to a second capsule handling mechanism; wherein both the capsule launching mechanism and the capsule handling mechanism comprise a capsule creation and delivery system; wherein both the capsule launching mechanism and the capsule handling mechanism comprise a rotating base; and wherein the capsules in the plurality of capsules comprises an inner void that can be filled with weights or supplies.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
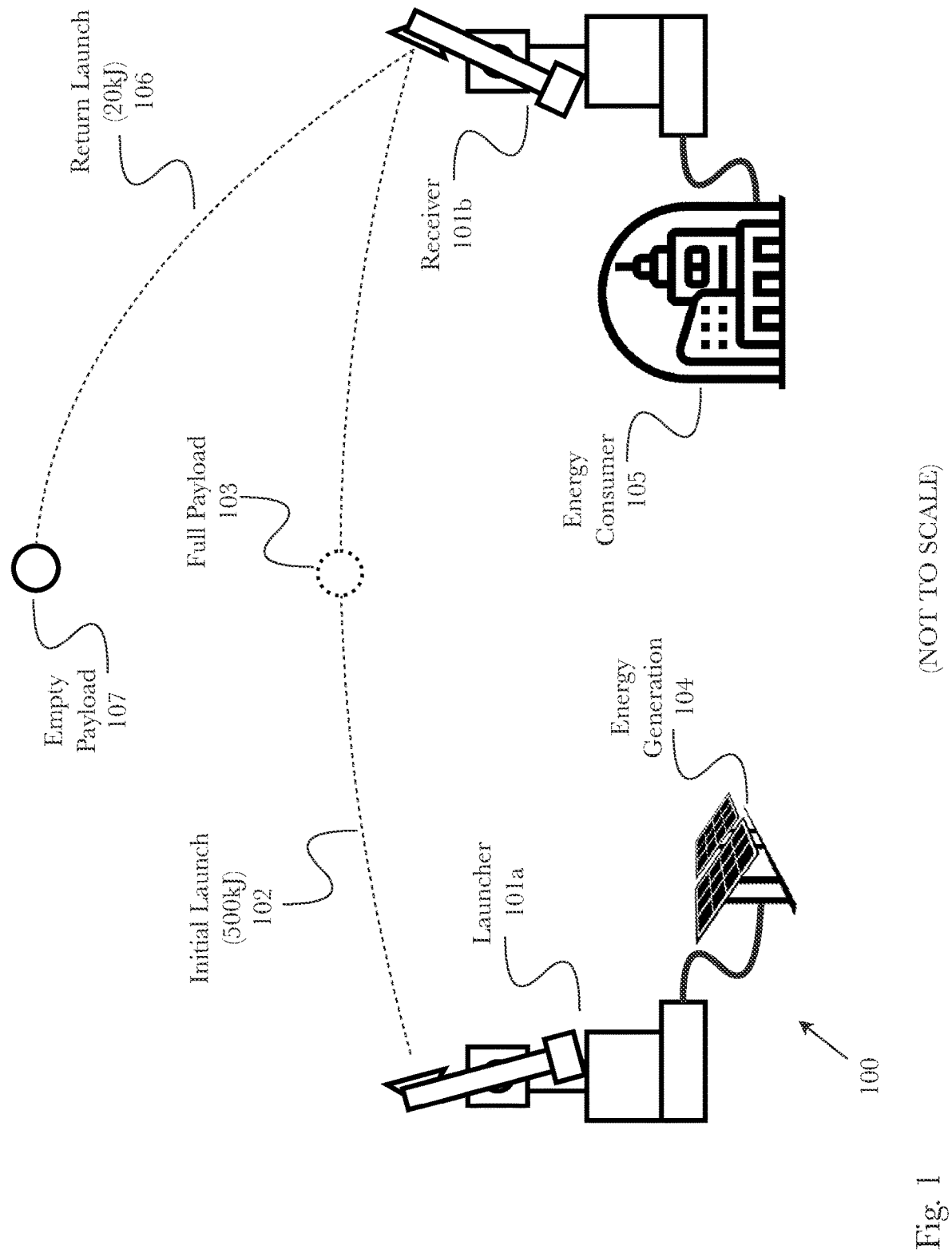
FIG. 1 is a diagram illustrating an exemplary energy and mass transport system.

The inventors have conceived, and reduced to practice, a system and method for transferring energy and mass (supplies) in low-gravity environments. The system comprises a launcher and a receiver. The launcher hurls a capsule at a high velocity such that, when caught by the receiver, a portion of the kinetic energy of the launched capsule is converted to potential energy and stored. The stored energy is used at the receiver end for applications such as living habitats, mining operations, life-support systems, etc. In some instances, a portion of the initial energy is used to lob the capsule back, if desired. Launchers and receivers can be set up in different spatial configurations in a low-gravity environment such as in a circle with a centrally located launcher, a launcher downstream of a chain of receivers, or other configurations.

In general, the system and method provides an efficient energy and mass transportation system mainly for uses in low-gravity environments. The launchers and receivers may be constructed identically thus saving manufacturing costs, wherein the only difference may be what powers each launcher/receiver. Therefore, it should be understood that any mention of "launcher" or "receiver" is simply the configuration mode of a capsule transport mechanism and that a launcher may become a receiver and a receiver may become a launcher.

Each capsule transport mechanism features regenerative braking to capture and convert kinetic energy when receiving a payload. This same motor may be used to spin the launching/receiving rotatable arm. However, there may be more motors in some embodiments, for example, to provide more degrees of freedom for movement, i.e., more angles and vectors for capsule trajectories.

There are many anticipated techniques of loading, releasing, and catching capsules described in the figures below, however, the systems and methods herein are not limited to those techniques and those with ordinary skill in the art will appreciate the various combinations and mechanisms that may be used for such means.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Detailed Description of Exemplary Embodiments and Aspects

FIG. 1 is a diagram illustrating an exemplary energy and mass transport system 100. The system 100 works based on the principles of kinetic energy and regenerative braking. The system 100 comprises a launcher 101a and a receiver 101b. A launcher 101a and a receiver 101b may be mechanically identical but are not required to be—with the exception that the launcher will typically have a more robust and powerful source of energy, e.g., a solar farm 104, fuel cell, fission, etc. Receivers may also have an external source of power which is not limited to any size or type, but will typically only be used for onboard electronics, sensors, and motors. Both the launcher 101a and the receiver 101b should have at least two-degrees of freedom. Lateral rotation of the base providing a full 360° view of the planar surface and a vertically rotating arm around a central axis. However, other embodiments may include a third degree of freedom allowing for a combination of transverse and longitudinal movements of the arm resulting in a broad range of acute, obtuse, and even 90° throwing and receiving angles.

The launchers 101a-b and capsules 103/107 can be scaled as needed dependent on the application. For example, the maximum distance between launchers 101a-b and maximum desired energy transfer may be primary drivers of the sizing of the launchers 101a-b and the sizing and weight of the capsule 103/107. The system 100 is designed to launch a capsule every 15 seconds but may be more or less depending on the configuration and intended application. According to one embodiment, the capsule may weigh 5 kilograms, and be launched with a velocity of 500 m/s, giving the launched capsule a kinetic energy of roughly 500 kilojoules 102. Capsules 103/107 may comprise an inner void for placing weights or supplies. According to one embodiment, and in an implementation of the system 100 on the Moon, capsules may be constructed from compacted regolith (Moon dust) and if needed, a chemical hardener/curer.

In an example use, first, a capsule 103 carrying supplies can be launched 102 from a launcher 101a that is externally powered by some form of energy (solar, nuclear, biomass, etc.) 104, to a receiver 101b that is connected to an energy consumer (Moon base, rover, scientific outpost, etc.) 105. The receiver 101b catching the capsule 103 converts the kinetic energy of the capsule 103 into electrical energy. Power has thus been distributed without cables.

The receiver 101b may comprise a supply-delivery system (belt-driven, vacuum system, tube system, etc.) to deliver the capsule 103 to a capsule station (not shown) so that the supplies may be offloaded, and the capsule returned to the receiver 101b for the return launch 106. If needed, the capsule's supply void may be filled with weight 106 (for example, if it increases the energy efficiency of the return launch or simplifies the calculation of the return trajectory), or may be filled with supplies to be returned to the launcher station. In the example shown here, the receiver returns the capsule empty 107, weighing 0.5 kg and launched at 300 m/s using energy of roughly 20 kJ for the return launch 106.

Figure 2:
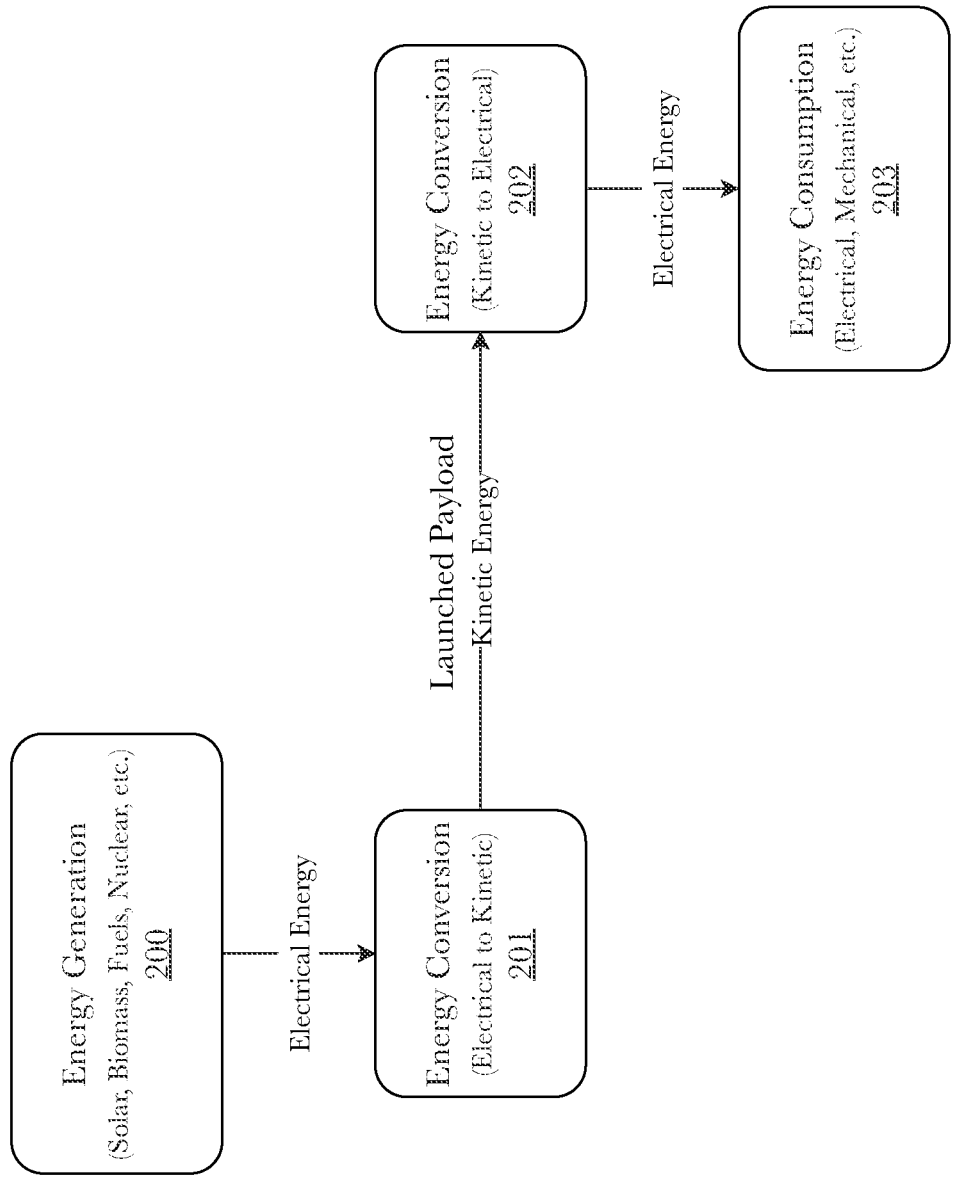
FIG. 2 is a diagram illustrating the energy flow of an energy and mass transport system.

FIG. 2 is a diagram illustrating the energy flow of an energy and mass transport system. The system works based on the principles of kinetic energy and regenerative braking. This kinetic method of energy transfer 200-203 may provide a continuous flow of capsules to provide a steady stream of power, depending on the complexity of the application. Now consider establishing a Moon base or Mars base, at first when the system is only supporting one or two operations at a time the system will be rather simplistic. The launch station sends a capsule at a high velocity to the receiving station. The velocity is so high that the trajectory of the capsule is almost flat, and a large amount of energy is transferred. The receiving station then sends the capsule back at a much lower velocity, just fast enough to cross the needed distance, making its trajectory parabolic. The capsule has traveled the same distance, but the amount of energy transferred to the original receiving station is much lower, meaning less energy is lost from inefficiencies. The capsule has now been returned, and an overabundance of capsules is not required for energy transfer. The closer the stations are the more efficient the system, since comparable energy lost, is minimized. However, absent an atmosphere, drag losses will ne trivial for Moon and Mars applications.

For more complex operations that have multiple components working in concert, a more complicated energy balance system must be created and maintained. Looking at planned missions for the Moon's south pole, eventually the south pole will have mining, water refining, an oxygen plant, a refueling station with launchpad, a lunar base and various rovers surveying the area. All of these operations have different energy requirements, some not needing any energy during certain periods, others having peak energy periods, and some going through different power cycles, and some requiring constant energy. This means the control system may have to account for time-varying loads that can change depending on different operating needs. The control system may ensure the number of capsules being transferred is balanced, ensuring that an excess of capsules does not need to be created.

Figure 3:
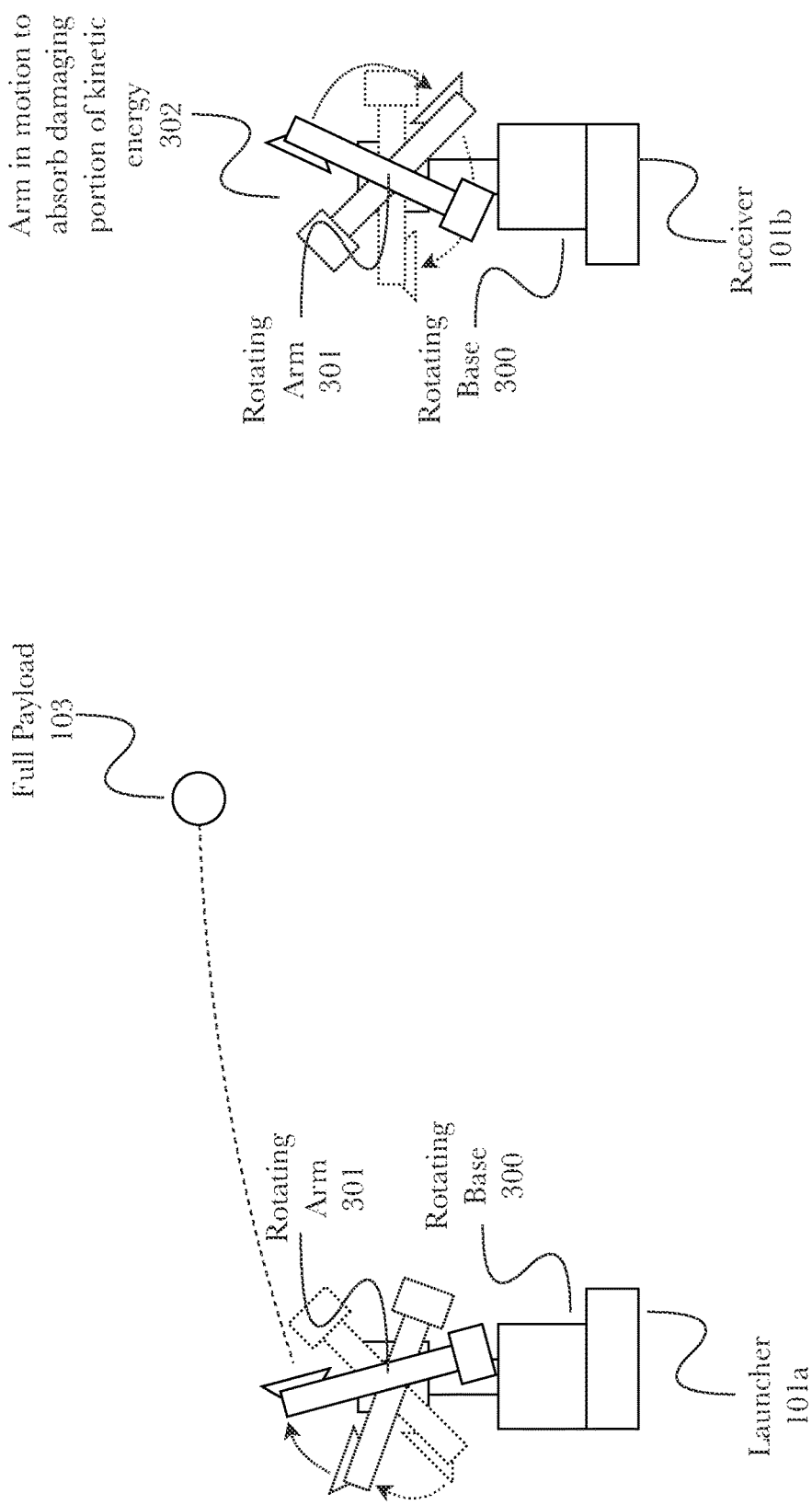
FIG. 3 is a diagram illustrating additional aspects of an exemplary energy and mass transport system.

FIG. 3 is a diagram illustrating additional aspects of an exemplary energy and mass transport system. To minimize wear and tear, and to be able to accept high capsule velocities, a receiving station 101b may place the receiving arm in rotary motion 301 to match the velocity of the incoming capsule 103 in order to reduce the capsule's impact force. This will allow the capsule 103 to be gently caught as the relative velocity of the capsule and the arm are the same 302. Once captured the receiving arm's motor will be switched to regenerative braking and the energy from both the capsule 103 and the arm 301 can be converted into electrical energy. This rotation for catching, may be determined depending on the fragility of the capsule's cargo, or depending on the amount of kinetic energy the receiving station desires, or even to protect the rotating arm 301.

If a receiving station 101b is an intermediate station in a chain of launches, i.e., the receiving station is going to immediately relay the capsule to a proceeding station, then the arm 301 may stay in motion and rotate its base 300 until the receiver is lined up with the next receiving station and release the capsule. This is an important aspect because starting and stopping the arm requires more energy than keeping the arm in motion.

According to one embodiment (not shown), the rotating arm may comprise a launching and catching mechanism at both distal ends of the arm 301. This would allow the arm to be in rotation while catching a first capsule with the first catching mechanism while returning a second capsule with the second catching mechanism.

Catching and launching mechanisms of the rotating arm may take various forms. One embodiment comprises a tether attached to a capsule that is electronically released at the precise moment to achieve the calculated trajectory and kinetic energy desired. The tether may be attached anywhere on the arm 301 and hold the capsule at the desired position near the distal end to achieve the momentum and velocity needed for the launch.

According to another embodiment, an inflatable bladder is constructed at the distal end of the arm and maintains a specific pressure. When the capsule is caught in the middle of the bladder, the specific pressure provides just enough flexibility that any damaging kinetic energy is dissipated while the remaining energy is converted via regenerative braking and the capsule is caught softly. The inflatable bladder may also be used to launch a capsule. The pressure being enough that the capsule sits in the bladder while rotating and when it needs to be released, the bladder is inflated in an expediate fashion to release the capsule.

According to yet another embodiment, a net or fabric sail is used to catch a capsule.

According to another embodiment, an electromagnet field is used to catch and release the capsule, granted the field acts of the composition of the capsule.

Another aspect comprises a supply-delivery system. The supply-delivery system (not shown) delivers the capsule to a receiving station near the base. A variety of supply-delivery systems are anticipated such as a conveyor belt system, a tube system, a vacuum system, a gravity system, or some combination thereof.

For example, using the inflatable bladder embodiment, the inflatable bladder may of a toroidal shape where the bladder when pressurized at a high pressure, nearly closes the middle opening of the toroidal shape. This would be useful for catching. At a low pressure, the bladder retracting the reveal more of the middle opening, enough so that the capsule may now fall into the inner chamber within the rotating arm. At this point, any of the supply-delivery systems may be employed.

According to one embodiment, if a gravity-fed aspect is used, paddles attached to turbines may line the corridor of the inner chamber such that as the capsule falls through the chamber it makes contact with the paddles and turns the turbines for extra power generation.

According to another aspect, an angle of rotation of the arm approximately 45° may be maintained during catching. Upon catching the capsule, the 45° (or an angle close to) rotation of the arm is maintained while the base performs a lateral rotation. This movement would keep the most momentum whilst relaying the capsule to a next receiver station.

According to another aspect, latches and weights may be used to capture some of the kinetic energy as gravitational potential energy. By allowing a latch to lock the rotating arm back after catching a capsule, a spring or other energy storing system may be compressed that when released gives it's compression or gravitational energy back to the rotating arm. Weights in the vertical structure of the capsule transport mechanism may be pulled upwards during a catch using a system of pulleys and locked into place after reaching a specific height. Again, that potential energy may be released and used for other purposes such as returning a capsule.

These aspects are merely exemplary and are meant to provide design options for the various embodiments and are not meant to be limiting.

Figure 4:
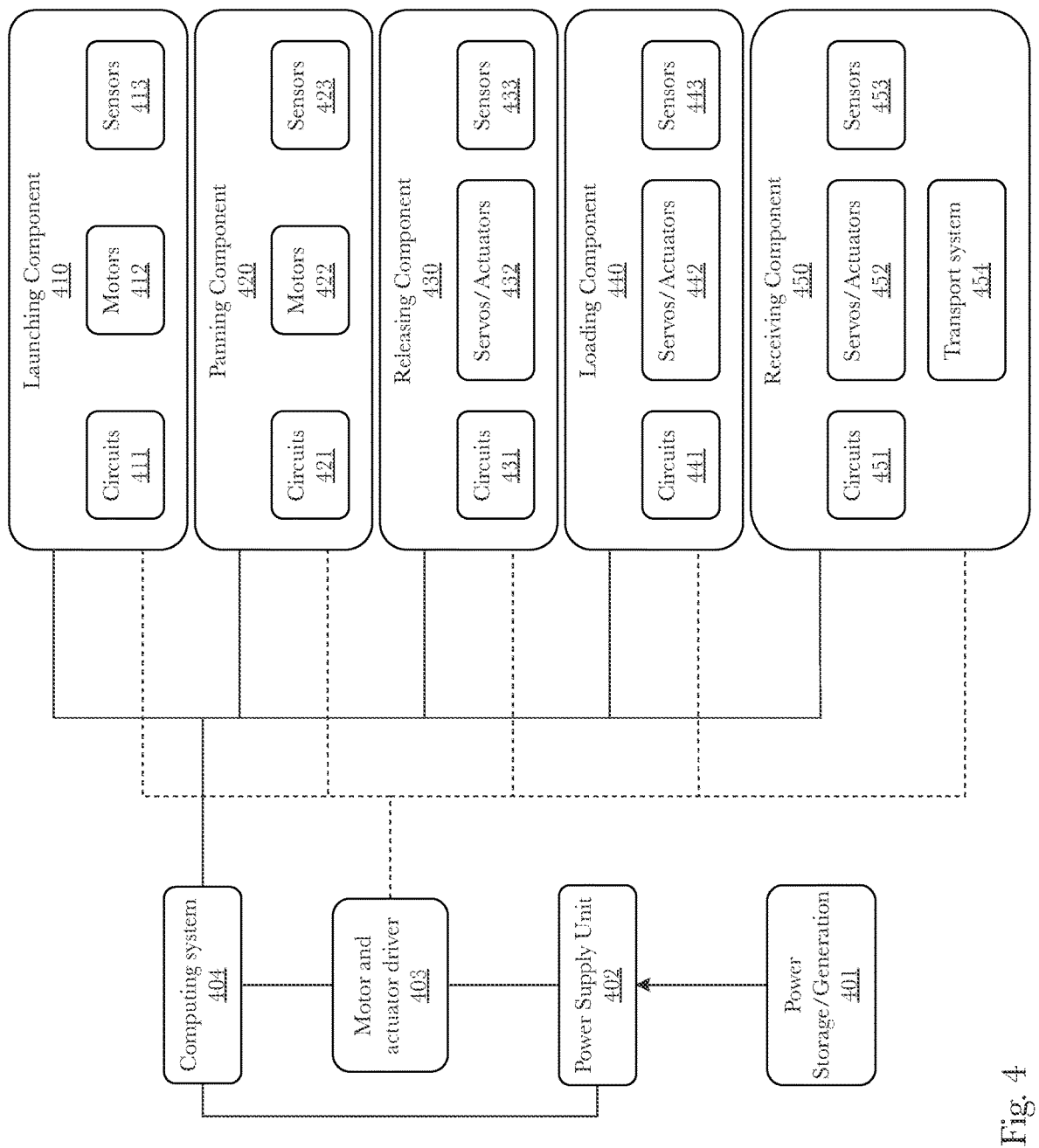
FIG. 4 is a diagram illustrating the components of an exemplary energy and mass transport system.

FIG. 4 is a diagram illustrating the components of an exemplary energy and mass transport system. The robotic arm comprises of 5 major components 410-450 with a supporting main system comprising power generation and storage 401, one or more power supplies 402, motor and actuator drivers 403, and one or more computing systems 404. The first component is the launching component 410. The launching component 410 comprises a plurality of electronic circuits 411, motors 412, and sensors 413. Because each launcher has at least two degrees of freedom, this figure description will address only two degrees of freedom, but those with ordinary skill in the art would appreciate that this may be scaled to as many degrees of freedom as desired. The first degree of freedom has a DC motor attached to an arm. The arms purpose is to be able to self-load capsules, launch capsules, and catch capsules. The motor can be directly attached to the arm or be connected through a gear train or transmission. The arm itself can be hollow. An inner channel can connect the arm to the rest of the robot on the opposite side to the motor. This inner channel will allow capsules to pass from the assembly into the arm. Once a capsule is at the center of the arm and the arm is already spinning, centrifugal force will push the ball toward the end of the arm. As the ball accelerates from the centrifugal force, it will start experiencing tangential acceleration from the spinning arm. Once it reaches the end of the arm, two possible release mechanisms (detailed in the release component), in addition to the other possible release mechanisms described in FIG. 3, can be used to accurately eject the capsule. The first degree of freedom may have sensors to determine the position and velocity of the arm with respect to an initial location. This allows the robot to determine when to load a capsule for launch.

The second component is the panning component 420. The panning component 420 comprises a plurality of electronic circuits 421, motors 422, and sensors 423. For the robot to service multiple stations it needs to be able to turn and face each station, a stepper motor can be used to precisely rotate the robot to the desired position. Positional sensors may be used to determine the position of the robot with respect to an initial location.

The third component is the releasing component 430. The releasing component 430 comprises a plurality of electronic circuits 431, servos and actuators 432, and sensors 433. When the capsule is "chambered" in the ready position, two additional possible release mechanisms may be used to eject the capsule. A Passive Release Mechanism (PRM) will require the arm to slow down at the right condition, allowing the capsule to self-eject and fly towards the awaiting station. An Active Release Mechanism (ARM) will require a stopper, controlled by one or more actuators/motors/servos 432, to constrain the capsule. At the right instance, the stopper will be actuated to open, allowing the capsule to eject and fly towards the waiting station. A high precision actuator can be used to control when a capsule is "chambered."

The fourth component is the loading component 440. The loading component 440 comprises a plurality of electronic circuits 441, servos and actuators 442, and sensors 443. To manage the number of present capsule(s) in the arm at any instance, a loading mechanism may be used. The loading mechanism (LM) refers to a controllable system that actuates open-close positioning of the chamber's gate, which separates the flight-ready capsule containers and the throw arm itself. Depending on the selection of the release mechanism, the LM may need varying performance requirements. For example, for a PRM system, the LM system may need a high-performance actuator that can fully toggle the chamber's gate position in milliseconds and with a low error rate. For an ARM system, the LM system may need a high-performance actuator that can fully toggle the chamber's gate position in seconds with a low error rate.

The fifth component is the receiving component 450. The receiving component 450 comprises a plurality of electronic circuits 451, servos and actuators 452, sensors 453, and a supply-delivery system (i.e., a transport system 454). Launched and Received capsules may need to go through a process of sorting and cleaning. According to one embodiment, a capsule transport system may be created using a combination of conveyor belt, gears, bearings, tracks, motors, vacuums, powertrains, sensors & control. Prior to launching, a capsule must be properly cleaned by going through a dust mitigation unit that will be a part of this system. After cleaning, the capsule will continue downstream in an enclosed route to the LM. At this state, the capsule is deemed flight-ready.

Figure 5:
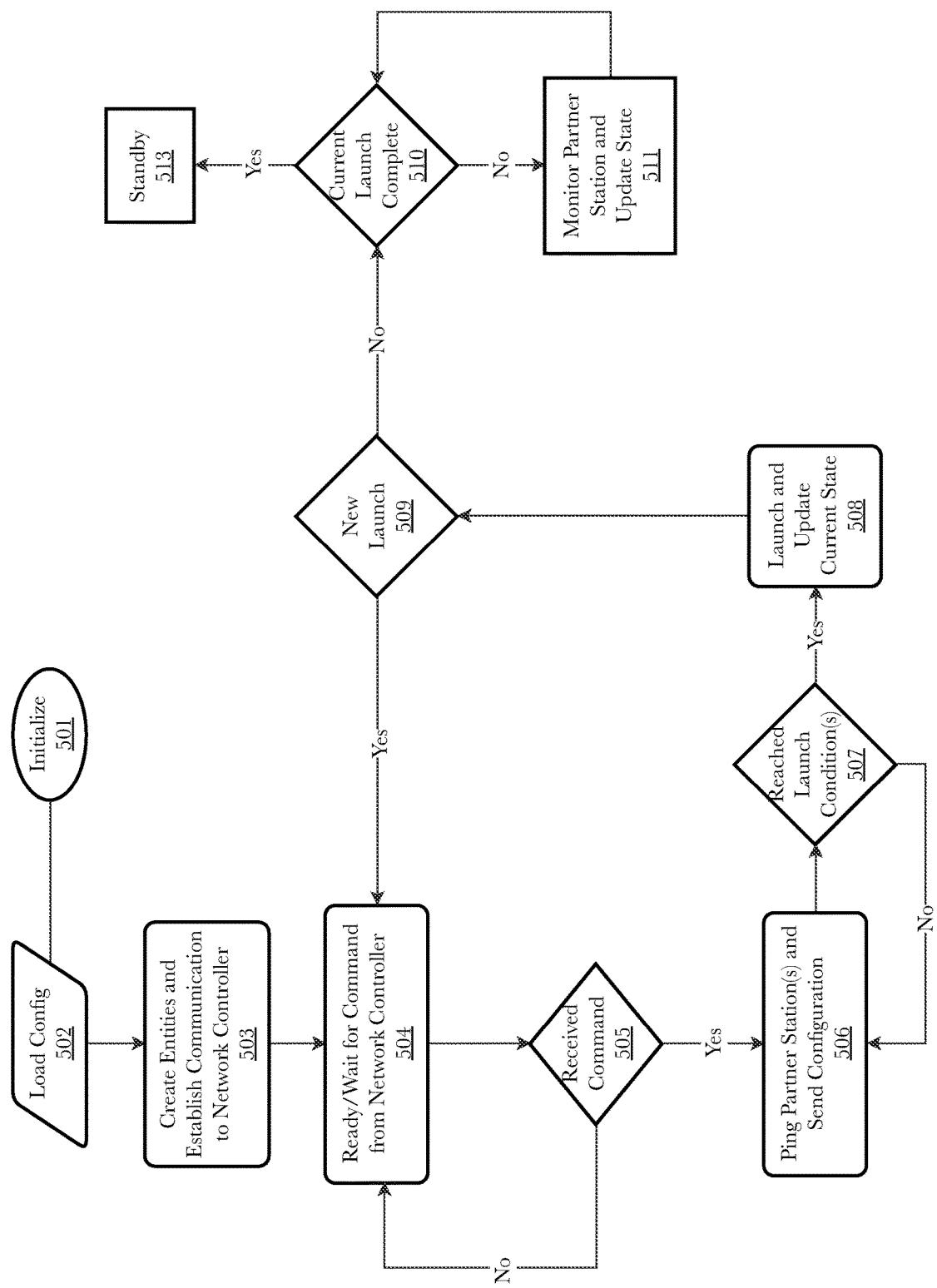
FIG. 5 is an exemplary method diagram illustrating the use of an energy and mass transport system.

FIG. 5 is an exemplary method diagram illustrating the use of an energy and mass transport system. An exemplary control system comprises a unit's Local Control System (LCS), which handles all local functions of the unit, a Unit-to-Unit Control System (UCS), which handles functional synchronization, and a Network Control System (NCS), which handles power management and schedule optimization of the network.

According to one embodiment, the method described herein is taken from the perspective of the EGS or main launcher but can be generalized to any launcher/receiver. In a first step 501 the launcher/receiver is initialized. A second step 502 comprises retrieving or receiving a configuration file and loading that configuration file into memory. The configuration file comprises the names (or some other unique identification) and locations of all launchers and receivers for this specific launch chain. The configuration file also comprises the calculated trajectories and release/catch parameters. Using the information contained in the configuration file, a third step 503 is performed wherein data packets containing configuration parameters for each receiver is generated and an initiation signal to the network controller is sent. In a fourth 504 and fifth step 505, the network controller sends a ready response to the computing system. In a sixth step 506, all receivers that are part of this launch chain are pinged, alerting them to prepare to receive a data packet. When a receiver is ready, it receives the data packet and prepares itself according to the launch parameters contained in the data packet's configuration file. When the main launcher confirms all receivers have received their parameters and have initiated their specific launch conditions 507, the launch is executed, and the current state of the launcher is updated 508.

From here, the main launcher determines if a new launch is in queue 509. If so, the new configuration file is loaded 502 and the process begins anew. If not, then that is indicative the launcher is set to receive a capsule back during this launch chain. A tenth step 510 comprises determining if the current launch is complete. The launch would likely not be complete on the first iteration of this step 510. Therefore, the launcher executes the parameters to become a receiver and monitors the other receivers for a signal to synchronize for an incoming capsule 511. Once the current launch is complete 510, the system is placed into standby mode 513.

Figure 6:
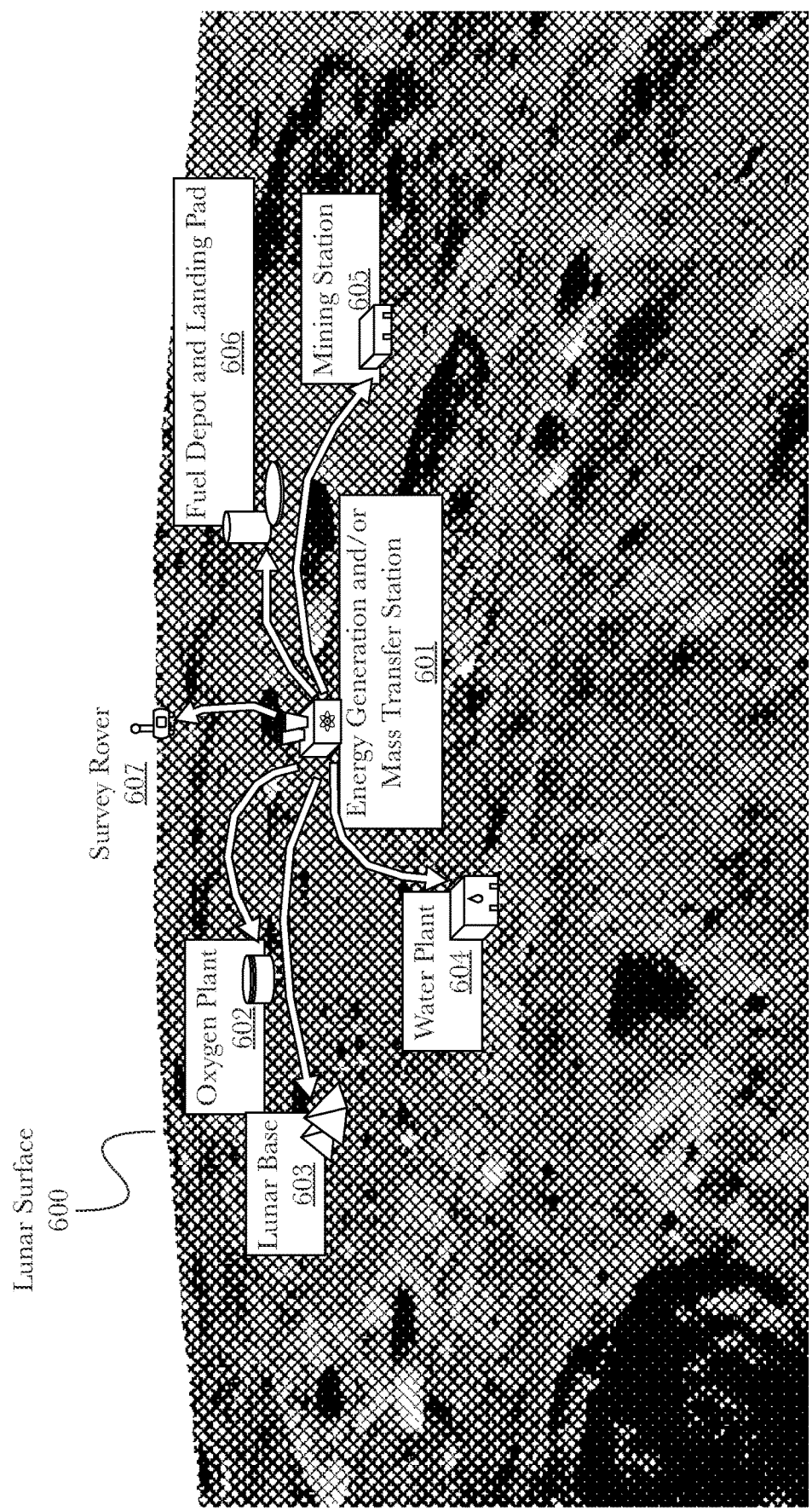
FIG. 6 is a diagram illustrating an exemplary implementation of an energy and mass transport system.

FIG. 6 is a diagram illustrating an exemplary implementation of an energy and mass transport system. This example illustrates a lunar surface 600 with a centrally located EGS and/or mass transfer station 601 that can launch capsules in a sequential fashion to each of the energy consumers 602-607. This implementation may be preferred depending on terrain, energy requirements, and launching capabilities of the EGS 601.

Figure 7:
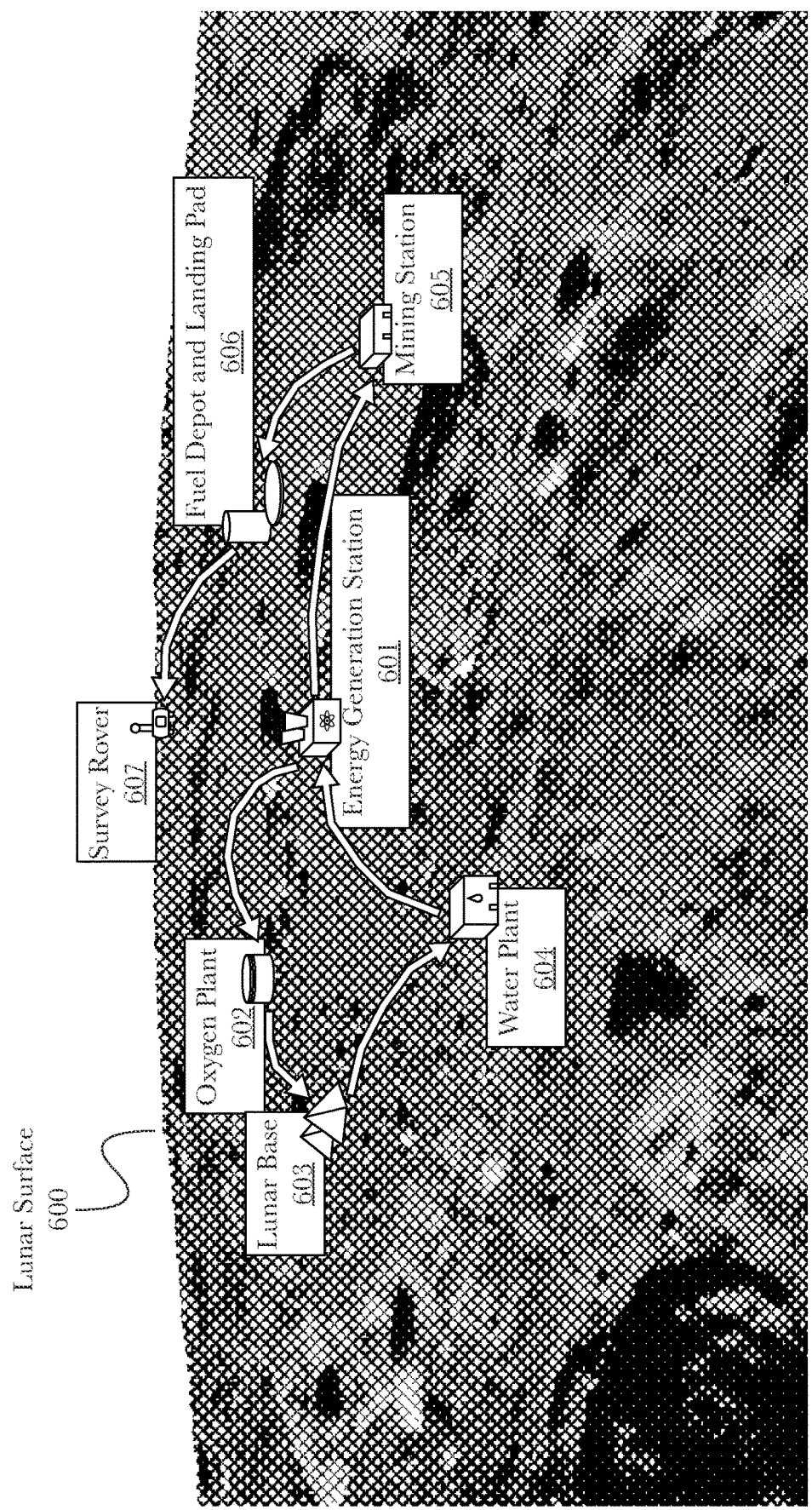
FIG. 7 is a diagram illustrating another exemplary implementation of an energy and mass transport system.

FIG. 7 is a diagram illustrating another exemplary implementation of an energy and mass transport system. With multiple operations requiring power the network system becomes more complicated. To meet varying duty cycles for different operations, while ensuring the system maintains a balance of capsules, the system will need energy to transfer from varying stations, not just the EGS 601. For example (assuming system efficiency of 81%), if the EGS 601 sends a first capsule to the mining station 605, and the mining station 605 receives 800 kJ, it can retain 75 kJ for its use, then transfer 587.25 kJ to the fuel depot and landing pad 606 which retains 200 kJ, then transfers the rest to a survey rover 607 which retains 313 kJ and either brings the capsule back or leaves it for waste or later retrieval. The EGS 601 immediately after sending that first capsule, sends a second capsule to the oxygen plant 602, the oxygen plant taking the appropriate energy and then sending the capsule to the lunar base 603. The lunar base 603 takes its appropriate energy before sending the capsule to the water plant 604 where the same appropriation occurs. Now, because the water plant 604 is only 100 meters away from the EGS station 601, it can return the capsule with minimal energy.

Figure 8:
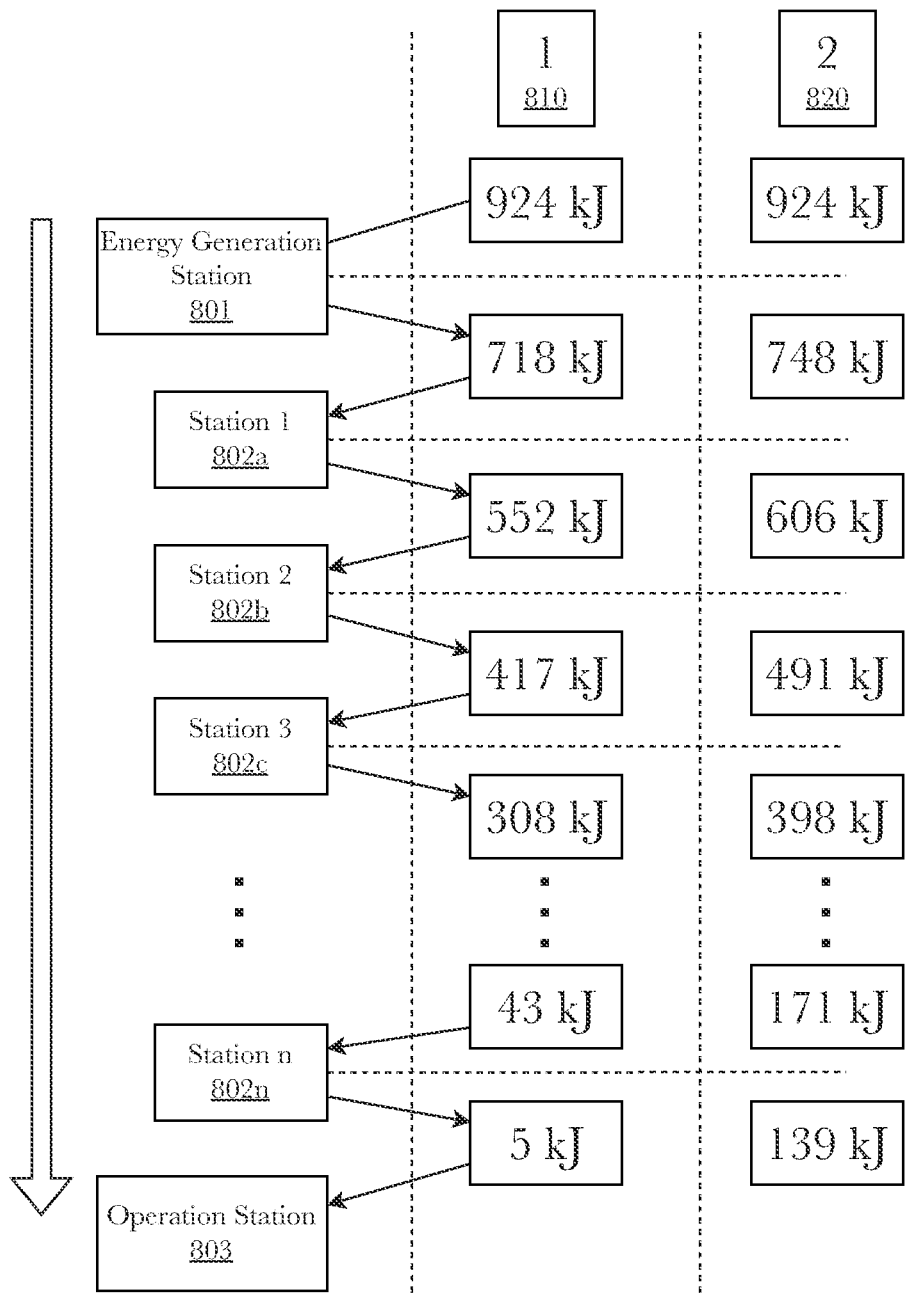
FIG. 8 is a diagram illustrating how to extend the range of an energy and mass transport system.

FIG. 8 is a diagram illustrating how to extend the range of an energy and mass transport system. This diagram illustrates two instances 810/820 of a capsule being relayed through a chain of stations 801/802*a-n* to power a distant operation station 803. The first instance 810 shows how energy losses propagate through the chain if each station is static when catching, having to spin up to launch to the next station. By the end of the first instance 810, barely 5 kJ makes it to the operation station 803.

In the second instance 820, each station 802*a-n* would spin up as the capsule approaches, it would then catch the capsule, traverse to the desired angle of release in the same rotation moving from the momentum of the capsule then release it to continue its journey to the next station. This eliminates the inefficiency stacking built into converting between electrical and kinetic energy repeatedly. The intermediary stations would still need to be charged, but instead of every other capsule being used to charge them, it could now be every 10.

Figure 9:
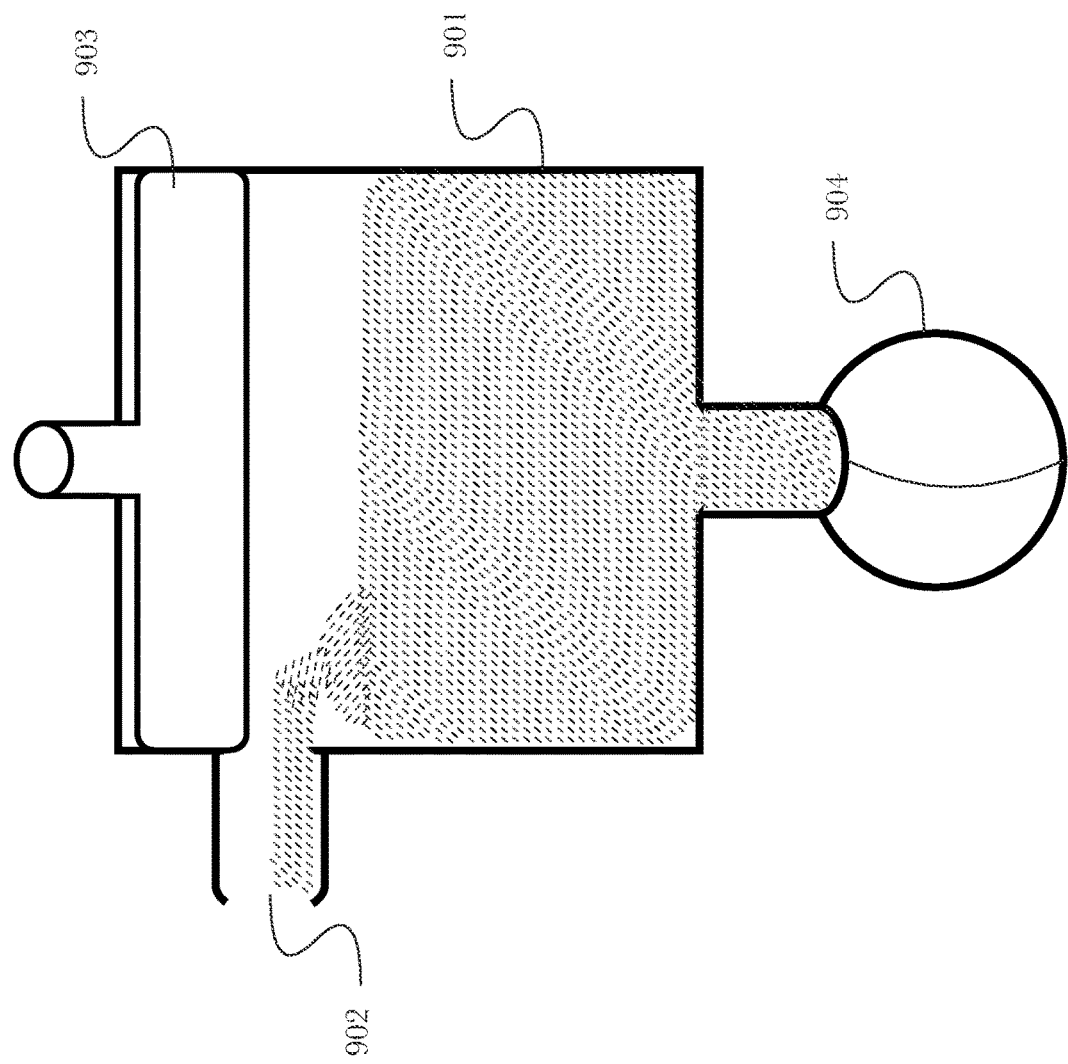
FIG. 9 is a diagram illustrating an exemplary payload mechanism for use in an energy and mass transport system.

FIG. 9 is a diagram illustrating an exemplary payload mechanism for use in an energy and mass transport system. The payload, a generic term used to define carried materials, may be loaded and enclosed inside the capsule automatically using the packaging means illustrated here. Each capsule may have variable compartments to allow a variety of materials to be stored separately.

To ensure proper packaging, a vacuum bag to secure the supplies and ensure no components are loose inside of the capsule. The vacuum bag held in the middle of a capsule mold 904, and accumulated dust can be collected and pumped 902 into a storage medium 901 and then pressed 903 into the capsule mold 904 securing the contents inside. More specifically, this would pin the transported material ensuring it doesn't shift in transit, if it can be considered a loose object. The dust bladder would have an accumulator that pulls in dust from the surroundings, it would then push dust into the capsule 901. Once a set pressure has been reached the press 903 will retract and the next capsule will be loaded.

The automated loading process may ensure that the combined center of mass of all payloads shall lie within a specific margin from the relative center of the capsule.

After the encapsulation process, the capsule shall be cleaned & transported using a system of conveyor belt (or other delivery system) to the desired loading mechanism of the launcher. The conveyor system may or may not be a clean and enclosed environment to ensure low dust collection during the transportation process.

Each launcher shall have an automatic loading system where it detects incoming capsules.

Capsules may be purposely built to carry batteries. The battery will need to accept high rates of acceleration but can be used to charge a station or prepare a rover/station for Lunar night hibernation. A quick connect device that's standardized will need to be used to allow the operating station to easily get power from the battery. It will also need a mechanical hardpoint that can be readily attached to a moving vehicle.

Capsules can carry PCM's (phase changing material) that store heat energy created by the launching system. Heat transfer capsules can have a set heating unit that captures the waste heat generated by the motor. Once the PCM has turned into a liquid state the capsule can be ready for transfer to another station. Once the heat capsule arrives it can be offloaded and the stored heat transmitted into the operating equipment.

A heat absorption capsule can be created that is painted in black. It will also be made up of PCM material, but it collects heat energy from the solar radiation it experiences while flying through space. Again, upon landing its heat energy can be absorbed by the end user (rover, station, etc.).

For system cooling, a cooling capsule may be created. Again, it would be made of a PCM material, it would heat up at the launcher site, then sent flying into space on its way to the next site. The capsule will be painted white, allowing it to cool through radiative cooling. The capsule will be launched multiple times until the PCM material has once again become solid. At which point it will be ready to absorb more waste heat.

Additional uses of an energy and mass transport system is described in the following paragraphs and comprises powering remote rovers, material transportation/transfer in deep space or orbit (removing the need for docking and matching trajectories), terrain mapping, firefighting (Earth and low gravity), and offshore windmill energy transfer.

When rovers are used for construction, they will need to be at different construction sites. They have a few options to stay charged during their planned workflow. They can carry solar panels, which will allow them to work during lunar day, but during night they either need enough batteries to keep them powered or need to return to a central charging hub. The solar panels will also add more weight, need to be pointed towards the sun, and need to remain free of lunar dust. They could always return to a central charging hub, but that reduces the amount of time they can spend working since they will have to travel back and forth between the charging stations. Or they could carry fission reactors that would produce all the needed electrical energy but have inherent environmental and safety risks.

Instead, power could be transported to these rovers as they moved about the lunar surface. They could change operational areas while remaining within the energy service range required. Looking past the moon, this technology can be used on Mars, asteroids, etc. essentially throughout the solar system.

A similar design discussed above can be used for material transportation in Orbit. Today, to transfer material in orbit between two ships or ship-to-station, the ship(s) must match orbit, then proceed through complex docking procedures. This takes a lot of time, forces ships to be launched on specific trajectories which may waste fuel, and has inherent risk with one mistake potentially causing catastrophe. In this application, there are at least two scenarios: surface to spacecraft; spacecraft to spacecraft.

For surface to space craft, there may be a launching station and a receiving spacecraft (satellites, space vehicles, space stations, reflectors, fueling depots, etc.). The launch station may be located in any generally favorable launch surfaces and conditions (e.g., the Moon's surface, Mars' surface, etc.). For spacecraft to spacecraft, there will be a launching spacecraft and a receiving spacecraft.

While launching and receiving capsules, the spacecraft(s) may have a reaction wheel or thrusters to counteract the momentum of the launch device. This will ensure the ship's orbit and orientation does not change.

For in-space material transportation, the system will transport materials such as excavated regolith, raw machinery parts, and packaged goods using capsules. Each capsule could be made of reusable materials and must withstand high applied force.

The capsule may have built in mini thrusters that allow for minute course changes. The selected propulsion technology may allow the capsule to course adjust with minimal required propellant needed. On the capsule, there may be a general command unit that serves several functions: communication, trajectory control, propulsion control, in-flight payload monitoring & control; or there may be multiple units that serve these functions separately or conjoined.

Once arrived, the capsule may be caught using a receiving mechanism configured for that purpose, which may in some configurations be a standardized receiving mechanism. The capsule may be configured with a docking mechanism for docking with the spacecraft such that the payload can be retrieved from the capsule without having to bring the capsule into the spacecraft.

For refueling application, the capsule may be delivered to the end user spacecraft or to a space refueling depot. The capsule may engage in refueling activity directly using a standardized refueling mechanism made by Space Kinetic or the industry's standardized refueling mechanism or be processed and handled by on-board system or personnel for refueling purposes.

The plan for any type of industrialization on the moon is to use rovers to transport materials to and from different lunar operations. The problem with rovers (similar to off-roading cars) they require clear paths to commute across. They require energy to travel, they can break down in transit, and need logic for random events that can occur. At least at first rovers will need to commute over treacherous terrain, weighed down by large payloads.

Instead of using a rover, this system can be used, the "capsule" that is used to transfer energy can also carry any type of material up to a set mass. That can include regolith, water, food etc. This allows raw materials and goods to be transported without the use of rovers in a set service range.

Lunar exploration rovers will be sent out to perform science missions, invariably samples will be taken at many sites. Rovers for the next 6 years will survive for as long as lunar day lasts (14 days) then they will run out of power and die. to process their samples, they will need to have an onboard lab, or a way to transport their samples to a laboratory.

To maximize rover exploration time and minimize weight, the sample could be sent back to the lander for analysis. If multiple rovers are deployed from one lander this would maximize system efficiency.

To survive Lunar night equipment must remain warm enough to function. Currently equipment is designed to go into a hibernation mode where they draw little power to keep fragile electronics warm. Typically, they use large batteries to store energy through the 14 days of lunar night. In some parts of the moon, like permanently shadowed craters where moon mining is planned to be done, heating is required at all times. This means electrical power is being converted to heat energy just to maintain functionality. If an existing system is already giving off large amounts of waste heat, that waste heat could be transferred to a system that needs heating.

An application is herein described for terrain mapping. To get high resolution pictures for an exploratory rover a few methods may be used. The lander that carried the rover could remain operational with a limited amount of power available for a flinger. The rover would also be carrying a flinger. A purpose-built capsule would contain an optical sensor, infrared sensor, battery, transceiver, and light source. The rover would launch the capsule towards the lander, the capsule would take several measurements/images as it sailed through space then be caught by the lander. The lander could then return the capsule to the rover again, taking more photographs. A computer on the rover can then analyze the images and determine if there are any nearby obstacles. The rover could then drive to the next location and repeat the process of optical measuring operation. The capsules power storage device could be charged wirelessly by the flinger. The transceiver would be used to send data from the optical system to the rover.

Since the capsule is being launched into the air on a parabolic trajectory, a large view of the surrounding area can be seen. By adding spin to the capsule, a variety of angles can be captured. The speed of spin, and speed of the capsule must be taken into account, along with lighting conditions and the maximum shutter speed of the optical sensor or the capability of the infrared sensor. By launching the capsule higher into space, the relative blur of the ground can be minimized. Due to the large area being mapped, the main light source will be the sun. If the rover travels outside of the service range of the lander's flinger, the rover can throw and catch the capsule.

When terrain is impassable, or locomotion equipment has reached end of service life, or no rover is planned to be included on the mission. The capsule can be single use, it will need a high-speed transmitter to upload the images during its flight. The sensors and transmitter will be rated for high impacts, so theoretically will be able to transmit after landing.

A specialized light source that's directed to a specific area could be used in low light conditions, the area that would be lit up would be relatively small. Essentially a laser would be added into the capsule, due to the small form factor it would only be able to be on for a short period of time. Its lensing would be calibrated to provide enough lumens to the target with a set dispersion radius. That dispersion radius will be the only part of the picture that is visible at the required high shutter speed. The optical sensor and laser will need to be synced so that when the shutter opens the laser is emitting and the desired location is appropriately lit. Once the shutter closes the Laser emitter should stop.

A proposed solution for earthbound firefighting may employ a system of launchers, using the system. Using the instant system and method can provide accurate long-range delivery service for capsules containing fire retardant, equipment, or resources. The launchers shall be located near a water source (i.e., lake, river, dam), or supported by a man-made reservoir or pipeline system to ensure access to water or firefighting solutions. Fire retardant reservoir can be built near the launch sites to aid in the usual perimeter solution approach in wildfire control.

For direct firefighting application, the primary goal of this implementation is to impose rapid control of the fire's spread via the usage of fire retardant solutions. The process is made up of several steps: First, the fire must be located and coordinated either by air units such as helicopters, planes, drones, or by land units such as firefighters, fire stations. Second, our launchers shall execute calibrating launches to map out zonal accuracy, which depends greatly on the topography of the fire's location. Third, our launchers can continuously launch capsules of retardant or water at one or more locations to implement perimeter control and assist with direct fire suppression. The launched capsules may be made up of biodegradable materials and may trigger the release of carried solutions using timed release mechanisms specifically designed for this application. The main advantage in this approach is that it reduces human presence in dangerous conditions and provides around the clock support.

For equipment and resource transportation application, using the same system of launchers created to combat wildfire, launchers can locate and launch capsules containing necessary emergency equipment such as first aid kits, food, water, etc. to frontline firefighters. The capsules will travel in a parabolic trajectory and deploy parachutes upon arrival in the pickup zone. During night or light-limiting conditions, the capsules shall carry strong LEDs to ensure proper visibility for landing and pickup.

The system shall have multiple launchers located in different locations, enabling a wide range of coverage. The system can be controlled either remotely by a designated command center located in safe regions, or locally by operator, depending on the operating conditions. Each launcher may also act as a receiver and be able to receive capsules from another launcher.

Earth based firefighting capability has been limited tremendously due to challenging terrain accessibility caused by both environmental factors and fire-related, i.e., smoke, factors. Currently, states like California, where the risk of yearly devastating wildfire has gone up dramatically, are looking for technological solutions that can enhance their firefighting capability. Predictive and preventative solutions like machine-learning algorithms or drone deployment are great approaches to gather information regarding ongoing fires and to help the U.S. Forest Service plan for potential events. However, these solutions don't address the logistical limitations that prevent firefighting crews and resources from being mobilized in remote areas and challenging terrains.

Several common solutions for mobilizing resources are the uses of airplanes and helicopters. Although these are better than land travel, airplanes and helicopters are limited to hours and conditions of operations; they can't fly after dark and in smoky conditions or in cramped spaces. Furthermore, flying overactive fires puts pilots and crew at risk. According to the U.S. Forest Service, about a quarter of all wildland firefighter fatalities are related to aviation. Hence, there's an urgent need for a new technology that can provide a similar or better logistical solution than that by airplanes and helicopters such as fire retardant delivery, resource delivery, and equipment delivery.

The instant system and method provide an application of offshore windmill energy because energy only needs to flow one way, from the windmill to the substation. The launching station used in space can be scaled to be used on the windmill platform. For a 10 MW windmill, four launchers could be used to launch capsules at 650 mph that weigh 50 kgs. This would allow for 10 MW of energy transfer. The receiving station does not need to follow the same design as the launch station. Every launch station will need its own receiving station wheel to spin, this allows the full kinetic energy from the capsule to be harvested by the system since it will force the capsule to come to a complete stop.

The specific design will vary as the environment is significantly different. The design will need to operate in the atmosphere with a variety of weather conditions. The capsule return can match the network design discussed in the power distribution system.

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for energy and mass transportation, comprising:
   a plurality of capsules;
   a capsule launching mechanism comprising a first rotatable arm and a rotatable base, the first rotatable arm comprising a releasing mechanism on a first distal end and a receiving mechanism on a second distal end; wherein the capsule launching mechanism performs the steps of:
      loading at least one capsule from the plurality of capsules into the first rotatable arm;
      initializing rotation of the first rotatable arm; and
      releasing the one capsule from the first rotatable arm; and
   the capsule handling mechanism comprising a second rotatable arm; wherein the capsule handling mechanism performs the steps of:
      catching the one capsule with the second rotatable arm; and
      converting the kinetic energy from the one capsule as electric energy using regenerative braking.

2. The system of claim 1, wherein the release mechanism and the receiving mechanism are the same mechanism.

3. The system of claim 1, wherein the release mechanism is a passive release mechanism or an active release mechanism.

4. The system of claim 1, wherein the capsule comprises a camera and a battery for terrain mapping.

5. The system of claim 1, the rotatable base comprising a motor for creating movement in a transverse and longitudinal direction.

6. A system for energy and mass transportation comprising:
   a plurality of capsules;
   a capsule launching mechanism comprising a first rotatable arm and a rotatable base, the capsule launching mechanism is located on a spacecraft, the capsule launching mechanism further comprises a reaction wheel or thrusters configured to counteract the momentum of the releasing step wherein the capsule launching mechanism performs the steps of:
      loading at least one capsule from the plurality of capsules into the first rotatable arm;
      rotating the base;
      releasing the one capsule from the first rotatable; and
   the capsule handling mechanism comprising the second rotatable arm; wherein the capsule handling mechanism performs the steps of:
      catching the one capsule with the second rotatable arm; and
      converting the kinetic energy from the one capsule as electric energy using regenerative braking.

7. The system of claim 6, wherein the capsule comprises a camera and a battery for terrain mapping.

8. The system of claim 6, wherein the preparing step comprises matching a tangential velocity of the second rotatable arm with the velocity the one capsule to reduce to one capsule's impact force.

9. The system of claim 6, wherein both the capsule launching mechanism and the capsule handling mechanism comprise a capsule creation and delivery system.

10. The system of claim 6, wherein the capsule handling mechanism is located on a spacecraft, the capsule handling mechanism further comprises a reaction wheel or thrusters configured to counteract the momentum of the catching step.

11. A method for distributing energy in space, on the moon, or on Mars, comprising the steps of:
   launching a capsule at a first velocity from a first rotatable arm, the first rotatable arm rotatable in a first plane and the first rotatable arm mounted to a rotatable base, the rotatable base rotatable in a second plane,
   catching the capsule with a second rotatable arm, the second rotatable arm mounted to a second rotatable base,
   converting kinetic energy from the catching step into electric energy using regenerative braking, storing the electric energy, the stored energy comprising a first amount, rotating the second rotatable base, re-launching the capsule with the second rotatable arm at a second velocity, the second velocity lower than the first velocity, a second amount of energy used to re-launch the capsule being less than the first amount of stored energy.

12. The method of claim 11 further comprising the step of spinning the second rotatable arm at a rate such that a tangential velocity of a distal end of the rotatable arm matches the first velocity, the spinning step occurring prior to the catching step.

13. The method of claim 11 wherein the second rotatable arm never stops spinning between the catching step and the re-launching step.

14. The method of claim 11 wherein the first rotatable arm spins 360 degrees about a center axis.

15. The method of claim 14, the first rotatable arm configured to release a capsule at a plurality of release angles.

16. The method of claim 11, the launching step occurring on a spacecraft.

17. The method of claim 11, the catching step occurring on a spacecraft.

18. The method of claim 11, the capsule comprising a camera and a battery for terrain mapping.

19. The method of claim 11, wherein the capsule launching mechanism is located on a spacecraft, the capsule launching mechanism further comprising a reaction wheel or thrusters configured to counteract the momentum of the releasing step.

* * * * *